United States Patent [19]

Mitter

[11] 4,099,461

[45] Jul. 11, 1978

[54] CONTROL DEVICE FOR CONTROLLING THE LEVEL OF A LIQUID IN A CONTAINER

[75] Inventor: Mathias Mitter, Senne, Fed. Rep. of Germany

[73] Assignee: Mitter & Co., Schloss Holte, Fed. Rep. of Germany

[21] Appl. No.: 654,172

[22] Filed: Feb. 2, 1976

Related U.S. Application Data

[63] Continuation-in-part of Ser. No. 413,992, Nov. 8, 1973, Pat. No. 3,981,619.

[30] Foreign Application Priority Data

Nov. 9, 1972 [DE] Fed. Rep. of Germany ... 7241055[U]

[51] Int. Cl.² .................... B41L 13/00; B41L 13/04
[52] U.S. Cl. .................................. 101/119; 101/122
[58] Field of Search ............... 417/44; 318/482; 101/119, 123, 122

[56] References Cited

U.S. PATENT DOCUMENTS

| | | | |
|---|---|---|---|
| 2,956,581 | 10/1960 | Pearson | 417/44 |
| 3,362,334 | 1/1968 | Ramsay | 417/44 |
| 3,408,984 | 11/1968 | Pullins | 101/119 |
| 3,592,132 | 7/1971 | Weber | 101/119 |
| 3,779,161 | 12/1973 | Tatebe | 101/123 |

FOREIGN PATENT DOCUMENTS

| | | | |
|---|---|---|---|
| 5,960 | 3/1967 | Japan | 101/335 |

*Primary Examiner*—William L. Freeh
*Attorney, Agent, or Firm*—Michael J. Striker

[57] ABSTRACT

A control device for controlling the level of a liquid in a container, a tank, a printing machine, or the like, which includes an elongated member in form of a tube or a cable, having a free end adjacent the desired maximum liquid level in the container and being adapted to feed a control medium, i.e., a gas, electric current, or light therethrough, which acts on a signalling device, or control means of a pump for feeding liquid in the container and which are actuated when the liquid reaches the free end of the elongated member. The elongated member being adjustably mounted for adjusting the position of the free end thereof in vertical direction.

17 Claims, 12 Drawing Figures

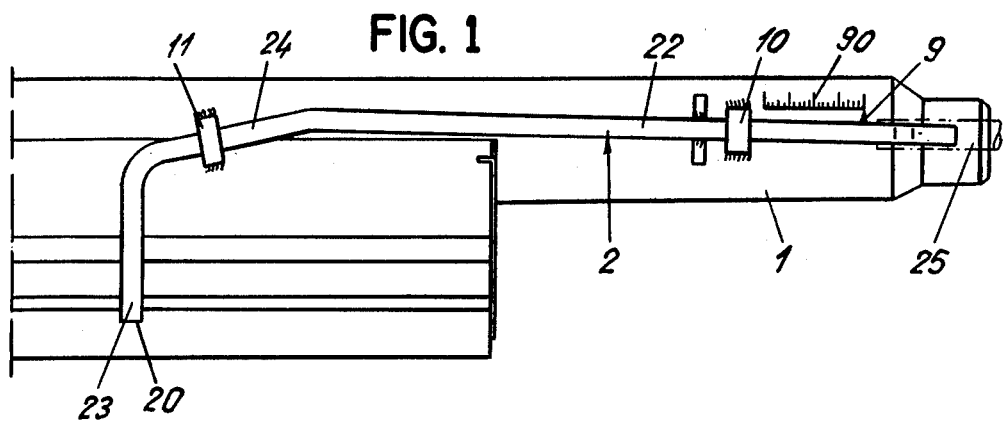
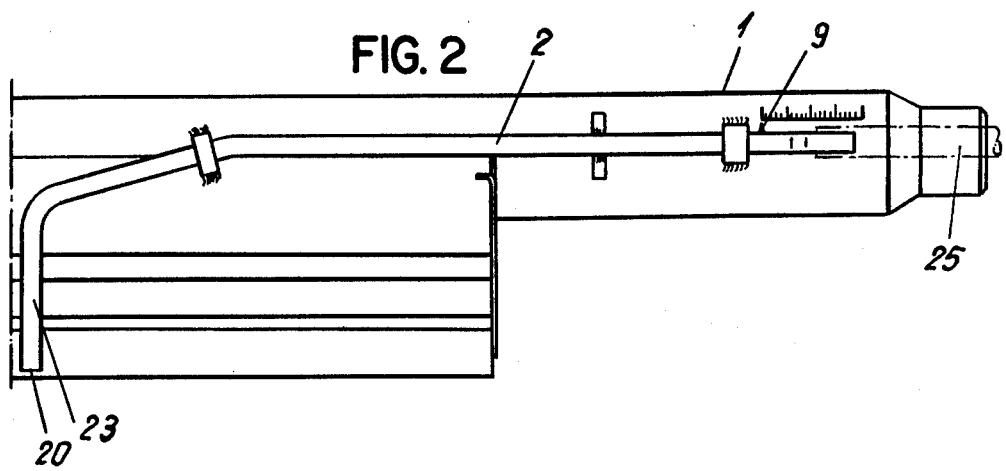
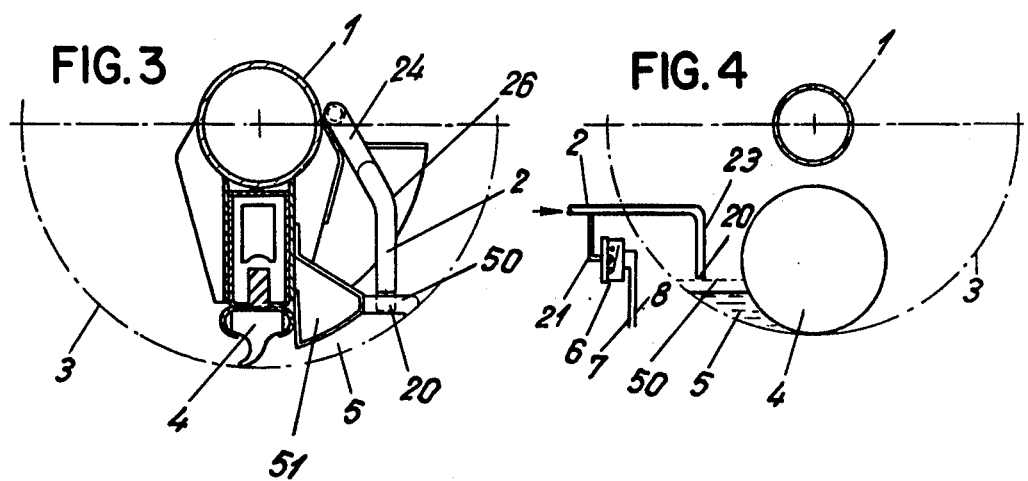

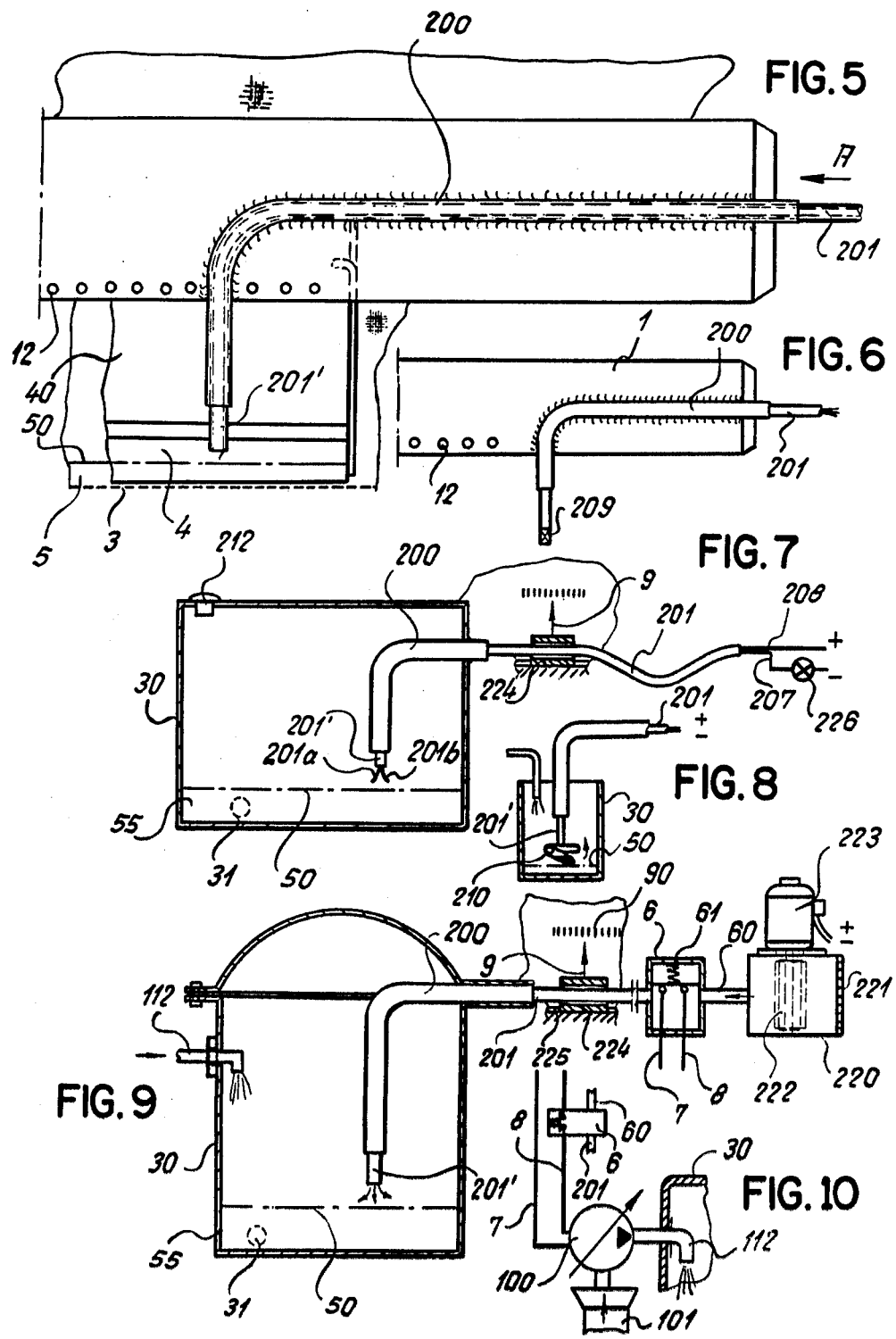

CONTROL DEVICE FOR CONTROLLING THE LEVEL OF A LIQUID IN A CONTAINER

This application is a continuation-in-part of application Ser. No. 413,992, filed Nov. 8, 1973, now Pat. No. 3,981,619.

BACKGROUND OF THE INVENTION

The present invention relates to a control device for controlling the level of a liquid in a container, especially in containers in which it is difficult to observe the level of liquid therein. Control devices for this purpose are known in the art, but one disadvantage of such known control devices is that they can be used only for establishing or controlling a fixed predetermined liquid level in the container.

In many applications, it is however, advantageous to vary the maximum level of a liquid in a container, for instance in a screen printing machine in which it is desired to maintain to one side of a squeegee which engages the inner surface of the screen drum of the printing machine a higher or lower pool of paint so as to control the amount of paint passing per time unit through the screen drum. Evidently, by varying the height of the paint pool maintained in the drum, the amount of paint passing through the screen drum per time unit may be accordingly varied.

For instance, during printing of crepe in such a screen printing machine more paint will be needed than during printing of smooth satin or the like.

Also in other applications, for instance, in the chemical industry, control of the liquid level in a container will be necessary, however, the control devices so far known in the art are not adapted to control the liquid level in a container at varying elevations.

SUMMARY OF THE INVENTION

It is an object of the present invention to provide a control device which permits controlling the level of a liquid in a container while the desired level of the liquid in the container may be varied to a considerable extent.

It is a further object of the present invention to provide for a control device of the aforementioned kind, in which the container and the means for varying the level of liquid therein, for instance a pump for feeding liquid into the container, may be spaced a considerable distance from each other.

It is an additional object of the present invention to provide a control device of the aforementioned kind in which the level of liquid in the container may be automatically maintained even if the desired maximum level of liquid may vary over a distance of several meters.

With these and other objects in view, which will become apparent as the description proceeds, the control device according to the present invention for establishing, respectively controlling the level of a liquid in a container and the like, mainly comprises elongated means for transmitting a control medium therethrough in which the elongated means are movable relative to the container and have a free end in the container adjacent the level of liquid therein, means cooperating with the elongated means for steplessly adjusting the position of the aforementioned free end in vertical direction relative to the container and the level of liquid therein, and means actuated by the control medium passing through the elongated means when the level of liquid in the container contacts the free end of the elongated means.

The elongated means may comprise a tube, an electric cable, or a cable provided with light guiding filaments and accordingly the control medium passing through the elongated means may be in the form of a gas, electric current or light.

The means actuated by the control medium passing through the elongated means may comprise pressure actuated switches, electrical switches, or selemium cells, actuated by the light passing through the light guiding filaments, and the means actuated by the control means may in turn cooperate with a signalling device or directly with a device for actuating and deactuating the pump feeding liquid in the container.

According to a further feature of the present invention, the elongated means through which a control medium is passed, that is a tube, hose or cable may be adjusted in two directions so that not only the elevation of the free end of the elongated means may be varied over considerable distances, but also so that the means actuated by the control medium passing through the elongated means may be placed at a rather large horizontal distance from the free end thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic side view of a control device according to the present invention as used for controlling the liquid level in a printing drum of a screen printing machine, in which the elongated means of the control device are in form of a tube, and FIG. 1 shows the lower end of the tube in an upper end position;

FIG. 2 is a side view similar to that shown in FIG. 1 and showing the lower end of the control tube in a lower end position;

FIG. 3 is a partial sectioned view of the device shown in FIG. 1;

FIG. 4 is a sectioned view similar to FIG. 3 and showing a modified arrangement in a schematic manner with a pressure actuated switch connected to the control tube;

FIGS. 5 and 6 are side views similar to FIG. 1 and respectively showing modified arrangements;

FIGS. 7, 8 and 9 are sectioned schematic views illustrating the use of the control device connected to various containers;

FIG. 10 is a schematic view illustrating the control of a pump for feeding liquid in a container as shown for instance in FIG. 9;

DESCRIPTION OF THE PREFERRED EMBODIMENTS

Figure 11:
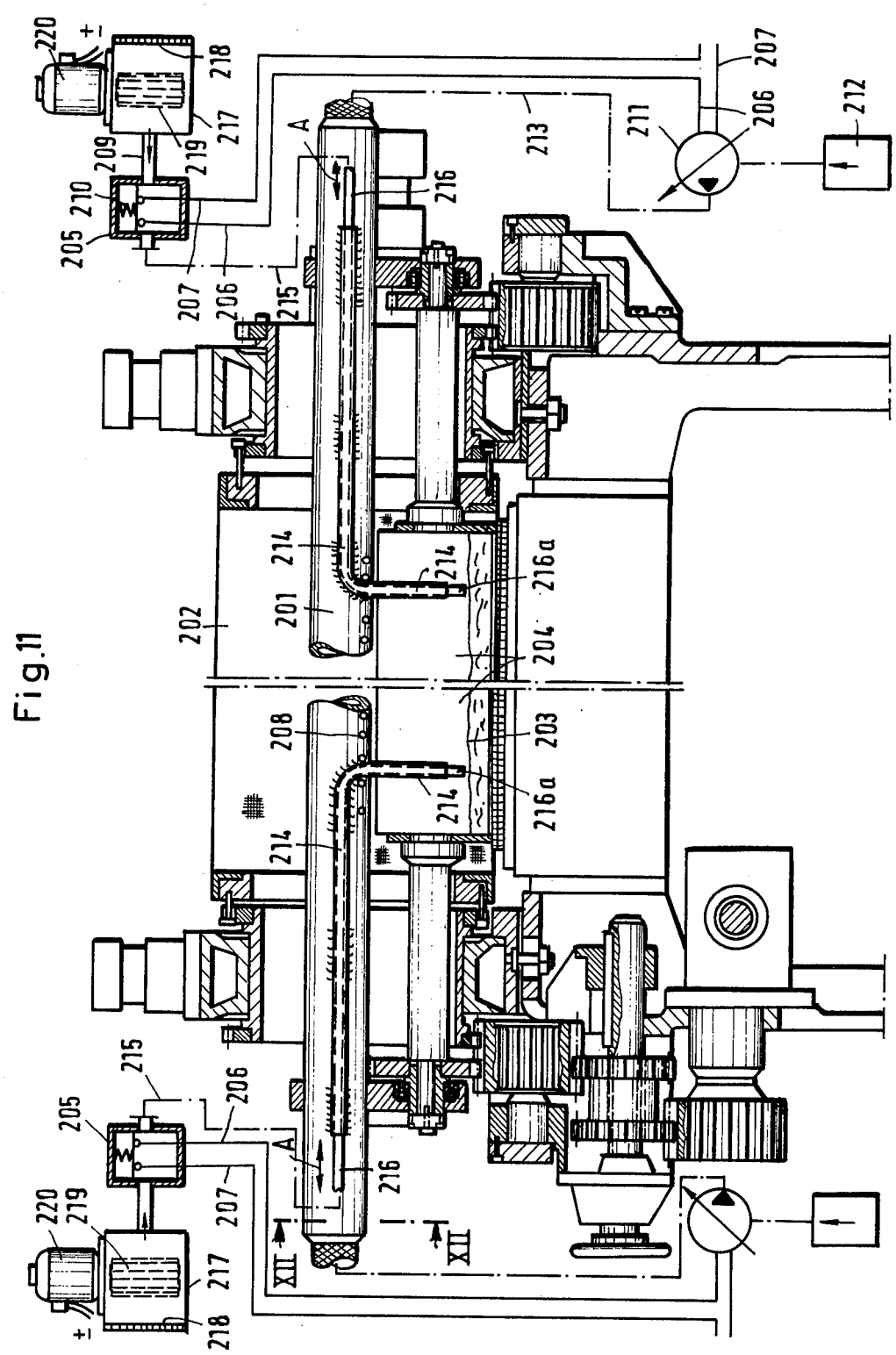
FIG. 11 is a diagrammatic partially sectioned view of a screen printing machine embodying the invention.

In the embodiment shown in FIGS. 1 - 3, the elongated means of the control device through which a control medium is passed is shown as a rigid control tube 2 and the control medium passed therethrough may consist of air under pressure, which is fed into the right end of the tube 2 through a flexible hose 25 connected thereto which at the other end is connected to a source of air under pressure not illustrated in these three FIGS. In the embodiment shown in FIGS. 1–3, the control device is used in combination with a screen drum 3, schematically illustrated in FIG. 3, of a screen printing machine for maintaining or controlling the level 50 of a pool of paint 5 maintained in the interior of the screen drum 3 to one side of a squeegee 4 engaging the inner surface of the screen drum, as best shown in FIG. 3. Paint is fed into the screen drum through a paint supply tube 1 to which the control tube 2 is adjustably connected in a manner as will be described later on. The printing machine elements which form the reservoir or pool 5, and the manner in which the supply tube 1 is mounted in the drum 3, may be the same as disclosed in U.S. Pat. No. 3,592,132. Instead of the squeegee 4 shown in FIG. 3, the screen drum 3 may also be provided with a squeezing roller 4, as shown in FIG. 4, so that at one side of this roller also a pool of paint 5 will be maintained the level 50 of which may be varied in order to assure a greater or smaller flow of paint per time unit through the screen drum, and the vertical position of the free end 20 of the control tube 2 has to be adjustable in dependence on the desired maximum level of the paint pool 5.

When the level of liquid rises in the screen drum it closes the lower open end 20 of the control tube 2 causing thereby a pressure variation in the interior of the tube which is used for actuating a control member, for instance a membrane switch 6, as schematically shown in FIG. 4, so that through the conductors 7 and 8 connected to the switch the operation of an electric motor driving a pump for feeding a liquid, for instance paint, through the tube 1 into the interior of the screen drum 3 may be stopped. Evidently, the pressure variation in the interior of the control tube 2 occurring upon closing of the open end 20 of the tube by the rising liquid in the container may also be used for operating valves so that such a valve may be closed whenever the liquid in the container reaches and closes the open end 20 of the control tube.

FIG. 4 schematically illustrates mounting means for mounting the control tube 2 to be adjustable in vertical direction. Such a simple mounting means as schematically illustrated in FIG. 4, can however not be used in all applications, and FIGS. 1 and 2 illustrate an arrangement in which the elevation of the open end 20 of the control tube 2 may be adjusted by moving the tube 2 relative to the axis of the paint supply tube 1 to thus impart to the end 20 a two-dimensional movement.

To obtain this result the control tube 2 in this embodiment comprises a substantially horizontal portion 22, a substantially vertical portion 23 having an open end 20 directed to the pool of paint 5 maintained in the interior of the screen drum 3 and an inclined intermediate portion 24 between the horizontal and the vertical portion. The horizontal tube portion 22 is guided for movement in axial direction in a guide member 10 which may for instance be welded to the paint supply tube 1 whereas the inclined tube portion 24 is guided in inclined guide member 11 which may for instance be mounted on the support 40 for the squeegee 4. In this arrangement, axial movement of the horizontal portion 22 will result in movement of the open end 20 of the tube in horizontal and vertical direction so that the position of the open end 20 of the control tube 2 may be changed for instance from the position shown in FIG. 1 to the position shown in FIG. 2. In such an arrangement, the other end of the control tube 2, that is the right end of the vertical portion 22, as viewed in the drawing, has to be connected by a flexible hose to the supply of air under pressure and such a flexible hose is indicated at 25 in FIGS. 1 and 2. Advantageously, a pointer 9 is fixed to the horizontal portion 22 which cooperates with a stationary scale 90, for instance provided on the paint supply tube, arranged in such a manner that the pointer 9 will indicate on the scale the actual elevation of the open end of the tube, so that an exact adjustment of the desired elevation of the level 50 of the paint pool 5 can be obtained.

In the embodiment shown in FIG. 3 there is further illustrated a displacement body 51 in the region of the paint pool 5 and in this construction the control tube 2 must be bent in two directions in order to pass over the displacement body. Therefore, the vertical portion 23 is provided with a bend 26 and the inclined intermediate portion 24 is bent out of the vertical plane in which the horizontal portion 22 is located and connected to the upper bent end of the vertical portion 23.

FIG. 5 schematically illustrates a modification of the arrangement shown in FIGS. 1–3 in which the control device is likewise used for controlling the liquid level of a paint pool in the screen drum 3 of a screen printing machine. In this arrangement, only partially illustrated in FIG. 5, the screen drum 3 extends also about the paint supply tube 1 to which holding means 40 for the squeegee 4 are provided in a known manner. In this arrangement the paint is passed in a known manner in the direction of the arrow A into the paint supply tube 1 and passes from the interior of the latter through a plurality of openings 12 to one side of the squeegee 4 and forms on this side a pool of paint 5, the upper level of which is indicated at 50 in FIG. 5. The screen drum 3 is rotated about its axis in a known manner not forming part of the invention and not illustrated in the drawing.

In the embodiment shown in FIG. 5 a rigid tubular guide member 200 is fixedly connected, for instance by welding, to the paint supply tube 1, and elongated flexible means 201, which may for instance consist of a hose formed from flexible plastic material, is guided for movement in longitudinal direction in the tubular guide member 200. As shown in FIG. 5, the tubular guide member is bent with a relatively large bending radius through an angle of 99° so that axial movement of the hose 201 relative to the tubular guide member 200 will change the elevation of the free end 201' of the hose. The control medium passing through the hose 201 is in this case also air under pressure, and as described in connection with FIG. 4 a membrane switch or any other control member actuated by variation of the pressure of the air passing through the hose 201 may be provided in communication with the interior of the hose so that when the open end 201 of the hose is closed by the rising liquid in the screen drum 3 and the pressure variation in the interior of the hose 201 resulting therefrom, an alarm or a control member for stopping feeding of further liquid into the screen drum may be actuated.

FIG. 6 schematically illustrates a variation of the embodiment as shown in FIG. 5, in which an ultrasonic reflector 209 is mounted on the free end of the elongated flexible member 201 which is guided for movement in longitudinal direction in the stationary tubular guide member 200 as described in connection with FIG. 5. In this case the elongated flexible member 201 is evidently of complicated nature and must contain the necessary elements to properly transmit signals emanating from the ultrasonic reflector 209. Such signals will evidently change depending upon the distance of the reflector 209 from the upper level 50 of the liquid in the container, and such signals may be used for actuating a signal device or a device for actuating or de-actuating means for feeding liquid into the container. The arrangement shown in FIG. 6 may also be used for controlling the level of the paint pool in a screen drum of a screen printing device.

Evidently, the control device according to the present invention may not only be used to maintain the level of a paint pool in the screen drum of a screen printing device at a desired elevation, but the control device may also be used for control of the liquid level in other containers or tanks.

Thus, FIG. 7 schematically illustrates the use of the control device according to the present invention for controlling the level 50 of a liquid 55 in a container 30 into which liquid may be introduced by hand or in other known manner through the opening closed by the stopper 12, after removing the stopper, and from which liquid is discharged through a discharge opening 31 below the level of liquid therein. In the embodiment illustrated in FIG. 7 there are provided elongated flexible means 201 in form of a flexible cable in which the portion of the cable extending in the container 30 is guided for movement in longitudinal direction in a stationary rigid tube 200. Two conductors 207 and 208 pass through this cable and the ends 201a and 201b of these conductors extend slightly and insulated from each other beyond the free end 201' of the cable which protrudes slightly beyond the lower end of the vertically extending portion of the tubular guide member 200. The aforementioned conductor ends 201a and 201b are arranged a small distance above the desired level 50 of the liquid 55 in the container so that when the liquid level rises to contact the ends 201a and 201b, an electrical circuit will be closed, which in turn causes illumination of the control lamp 226 in the circuit. The outer or right ends, as viewed in FIG. 7, of the two conductors 207 and 208 are connected to a supply of electrical energy, preferably a low voltage current. Evidently, in this case, the liquid fed into the container must be electrically conductive. Preferably a guide member 224 is fixed in any convenient manner to the portion of the cable 201 extending to the right, as viewed in FIG. 7, beyond the tubular guide member 200, and this guide member may be moved in horizontal direction on appropriate guide rails and fixed thereto in a known manner in any adjusted position to thereby change the distance of the conductor ends 201a and 201b from the bottom of the container 30. Preferably, a pointer or similar indicating member is fixed to the guide member 24 and this pointer cooperates with the stationary scale so that the elevation of the conductor ends 201a and 201b may be read on the scale. As shown in FIG. 7, there is a slack provided in the cable 201 between the guide member 224 and the control lamp 226 so that the cable portion to the left of the guide member may be adjusted through a considerable distance without the necessity of changing the position of the control lamp 226.

In the embodiment shown in FIG. 8 a tiltable mercury switch 210 is connected to the lower free end of the cable 201 which in this embodiment is likewise guided for movement in longitudinal direction in a stationary tubular guided member as described in connection with FIG. 7. Rising of the liquid level 50 will cause tilting of the mercury switch in the direction of the arrow shown in FIG. 8, causing thereby closing of contacts provided therein so that current will pass through the conductor in the cable to illuminate a signal lamp as shown at 226 in FIG. 7, or to actuate the control circuit of a pump or the control circuit of an electrically operated valve to stop further feeding of liquid into the container when the liquid level reaches a predetermined elevation.

FIGS. 9 and 10 schematically illustrate the use of a control device according to the present invention for regulating the level 50 of a liquid 55 in a container 30 into which liquid is fed through a conduit 112 by means of a pump 100 (FIG. 10) which is preferably operated by an electromotor and the output of which is preferably adjustable. The control device shown in FIGS. 9 and 10 may include a stationary rigid tubular guide member 200 through which an elongated flexible means, in this case preferably an elongated flexible hose 201 slidably extends, the lower free end 201' of which is spaced slightly upwardly from the desired level of liquid 55 in the container. The right outer end of the flexible hose 201 communicates with the interior of a membrane switch 6, the membrane of which is of electrically conductive material and is normally in engagement with two contacts provided on the end of two conductors 7 and 8 forming a control circuit for actuating the electric motor driving the pump 100 so that in the position of the membrane as shown in FIG. 9, the pump 100 is actuated to feed liquid from a liquid supply 101 through the pipe 112 into the container 30. A conduit 60 provides also communication between the interior of the membrane switch 6 and a housing 220 in which a radial blower 222 is located which sucks air through a filter 221 extending over an inlet opening of the container and blows the air through the conduit 60 into the membrane switch 6 and from there through the hose 201 so that air at a predetermined pressure may pass through the open outlet end 201' of the hose as long as this outlet end is located above the level 50 of the liquid in the container. The blower 222 may be driven by an electric motor 223 mounted on top of the housing 220. A compression spring 61 engaging the membrane extending transversely through the housing of the membrane switch 6 normally holds the membrane in engagement with the contacts at the ends of the conductors 7 and 8, but when the level of liquid in the container 30 rises to close the open lower end 201' of the hose 201, the air pressure in the hose evidently rises causing thereby deflection of the membrane against the action of the spring 61 and disengagement of the membrane from the contacts provided at the upper ends of the conductors 7 and 8, thereby stopping further operation of the pump 100. When the level of the liquid in the container drops again, the air pressure in the hose 201 will correspondingly drop, so that the membrane of the membrane switch 6 will flex under the influence of the spring 61 back to the position shown in FIG. 9 thereby restarting operation of the pump.

The device shown in FIG. 9 may also include a guide member 241 fixed to the portion of the hose 201 extending in horizontal direction to the right of the tubular guide member 200, and the guide member 224 may be guided for movement in longitudinal direction on a guide 225 and be fixable thereto in any known manner in any of the adjusted positions thereof. Preferably, the guide member 221 is also provided with a pointer 9 cooperating with a stationary scale so that the position of the free end 201' of the hose may be read on the scale 90. It is to be understood that the hose 201 is provided between the guide member 224 and the stationary membrane switch 6 with an appropriate slack as indicated in FIG. 7 to permit adjustment of the free end 101 without necessity of changing the position of the membrane switch 6.

Instead of using an ultrasonic reflector at the end of the flexible cable 201 as shown in FIG. 6, it is also possible to connect illuminating means slightly spaced from the free end 201' of the cable for movement therewith and to provide in the cable light-guiding plastic filaments so that light emanating from the illuminating means may pass through these filaments to selenium cells cooperating in a known manner with the light guiding filaments and forming part of a control circuit for actuating and de-actuating a pump for feeding liquid into the container. In such a construction, when the liquid in the container rises so that liquid passes in the space between the illuminating means and the free ends of the light guiding filaments, the intensity of the light transmitted through the light guiding filaments to the cells will evidently change, especially if the liquid in the container should be opaque, to thereby de-activate the pump, and correspondingly re-activate the pump after corresponding dropping of the liquid level.

Figure 12:
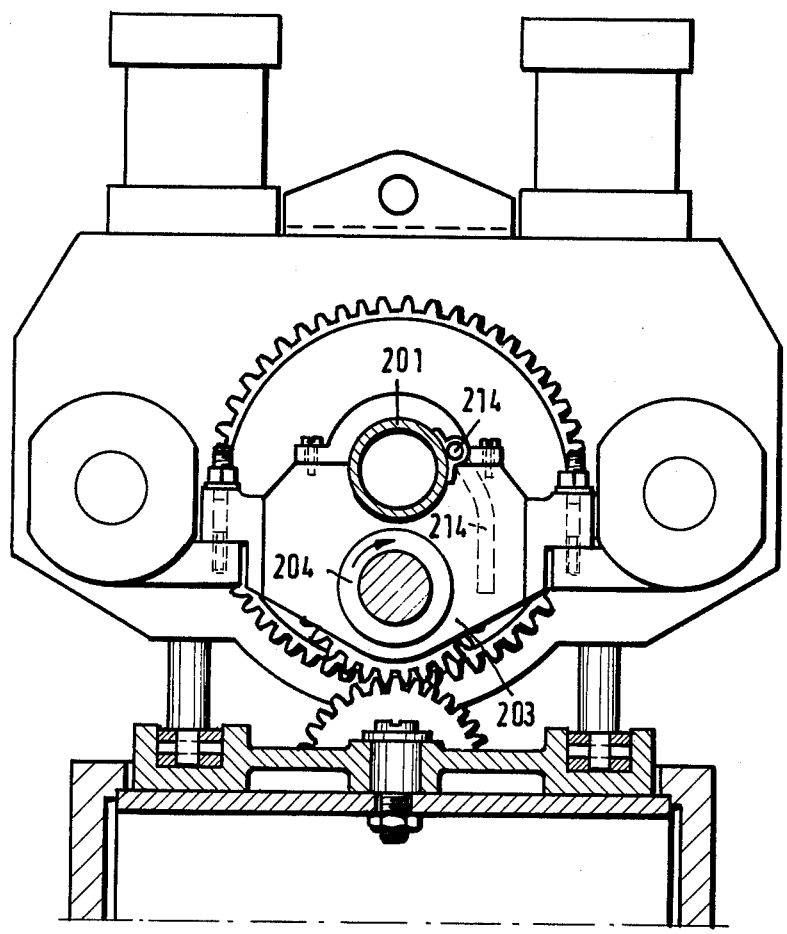
FIG. 12 is a section on line XII—XII of FIG. 11.

FIGS. 11 and 12, show, by way of example, a device according to FIG. 9 embodied in a screen printing machine.

An ink supply tube 201 extends through the interior of an endless, tubular printing screen 202, e.g. of the type disclosed in U.S. Pat. No. 3,592,132. It is mounted outside the open axial ends of the screen 202 as illustrated and provided within the confines of the screen with outlet openings 208 for the printing ink. A driven squeege roller 204 is mounted within screen 202 for rotation about an axis which parallels the axis of rotation of the screen 202. The discharged ink forms within the screen adjacent one side of squeegee 204 (i.e. ahead of the same, as considered in the direction of rotation), a pool of ink having the upper level 203 (see FIG. 12).

A rigid, tubular guide member 214 is mounted on tube 201 (actually, there are two guide members 214 here, each entering through a different axial end of the screen 202), e.g. by means of welds as illustrated. An elongated flexible hose 216 extends through each guide member 214 and has an open end 216a facing the upper liquid level 203. These hoses 216 can be moved in the direction of the double-headed arrows A, so as to raise or lower the open ends 216a relative to the liquid level. During such movement, the hoses 216 slide in the respective guides 214. This sliding movement can be effected by the means 224, 225 described with reference to FIG. 9.

The outer ends of hoses 216 communicated with respective diahpragms or membrane switches 205, the diaphragms of which are of electrically conductive material. The diaphragm is normally in engagement with two contacts provided on the ends of two conductors 207, 208 forming a control circuit for actuating the electric motor driving the pump 211 so that when the diaphragms are in the position shown in FIG. 11, the respective pump 211 is actuated to feed liquid from a liquid supply 212 through the pipe 213 into the interior of screen 202. A conduit 209 provides communication between the interior of the respective switch 205 and a housing 217 in which a radial blower 219 is located which draws air through a filter 218 extending over an inlet opening of the container and blows the air through the conduit 209 into the switch 205 and from there through the hose 216 so that air at a predetermined pressure passes through the open outlet end 216a of the respective hose as long as this outlet end is located above the level 203 of the liquid in the screen. The blower 219 may be driven by an electric motor 20 mounted on top of the housing 217.

A compression spring 210 engaging the membrane and extending transversely through the housing of the membrane switch 205 normally holds the membrane in engagement with the contacts at the ends of the conductors 207, 208, but when the level of liquid of the pool in the screen 202 rises sufficiently to close the open lower end 216a of the respective hose 216, the air pressure in the hose evidently increases. This causes deflection of the membrane against the action of the spring 210 and disengaging of the membrane from the contacts provided at the upper end of the conductors 27, 208, thereby stopping further operation of the pump 211. When the level 203 of liquid in the screen drops again, the air pressure in the hose 216 will correspondingly drop, so that the membrane of the membrane switch 205 will flex under the influence of the spring 210, back to the position shown in FIG. 11, thereby restarting operation of the pump 211. of course, instead of having two of the hoses 216 and of the associated switches 205 and other components, the machine of FIGS. 11 and 12 could also be operative with a single set of these components.

It will be understood that each of the elements described above, or two or more together, may also find a useful application in other types of control devices differing from the types described above.

While the invention has been illustrated and described as embodied in a control device for controlling the level of a liquid in a container, it is not intended to be limited to the details shown, since various modifications and structural changes may be made without departing in any way from the spirit of the present invention.

A control device which includes a tubular guide member in which an elongated flexible means is guided for movement in longitudinal direction as described above and which is adapted for transmitting a control medium therethrough, has proven especially advantageous since such an arrangement not only permits to adjust the vertical position of the free ends of the elongated flexible means within a great range but also permits to arrange means actuated by the control medium passing through the elongated flexible means at any desired distance from the container wherein the level of liquid has to be regulated. The elongated flexible means may in this case be simply a flexible hose through which air at a predetermined pressure is guided, or the elongated flexible means may be formed of a cable provided with electrical conductors, means for transmitting signals from an ultrasonic reflector therethrough, or be provided with light guiding filaments cooperating with illuminating means at the free end of the cable in the manner as described above. If the elongated flexible means is in form of a hose, the control medium passed therethrough is preferably air under pressure, but air may also be sucked through the hose to provide an under-pressure therein, or liquid may be passed through the hose if discharge of said liquid in the container should not be objectionable. If suction means are connected to the outer end of the hose appropriate means have also to be provided to prevent sucking of liquid in the container into the hose.

Without further analysis, the foregoing will so fully reveal the gist of the present invention that others can by applying current knowledge readily adapted it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a screen printing device, a combination comprising an endless printing screen bounding an elongated space adapted to receive a printing medium; means for advancing said printing screen in an endless path with reference to a web onto which said screen is to print; means for admitting flowable printing medium into said space; elongated transmitting means extending into said space through one axial end thereof for transmitting a control medium therethrough said transmitting means having a free end located in said space upwardly adjacent the printing medium therein; means encompassing said transmitting means in at least two spaced regions and mounting said transmitting means for longitudinal movement in a path having a horizontal and a vertical component to steplessly adjust the position of said free end in vertical direction relative to said printing screen so that the position of said free end may be adjusted in accordance with the desired level of printing medium in said space; and control means operatively connected with said admitting means and actuated by the control medium passing through said transmitting means, when the level of printing medium rises to and contacts said free end of said transmitting means, said control means being operative for controlling the operation of said admitting means when actuated by said control medium.

2. Control device as defined in claim 1, wherein said stepless adjusting means are constructed for adjusting the position of said free end in vertical and horizontal directions.

3. Device as defined in claim 1, wherein said elongated transmitting means comprises a substantially rigid tube having a substantially horizontal portion, a substantially vertical portion provided with said free end, and an inclined intermediate portion between said horizontal and vertical portions, said mounting means comprising first stationary guide means guiding said horizontal portion movable in horizontal direction and second stationary and inclined guide means guiding said inclined portion movable in direction of its inclination so that by moving said tube relative to said guide means the position of said free end may be adjustable in vertical and horizontal direction.

4. Device as defined in claim 1, and including indicator means fixed to and movable with said elongated transmitting means and stationary scale means cooperating with said indicator means.

5. A device as defined in claim 1, wherein said screen is a tubular printing screen mounted for rotation about a horizontal axis, and said transmitting means extend into said space through an axial end of said tubular printing screen.

6. Device as defined in claim 1, wherein said elongated transmitting means is in form of a tube, and said control medium passing through the tube is a gas, and including a flexible hose connected to the end of the tube distant from said free end for feeding gas under pressure into said tube.

7. Device as defined in claim 6, wherein said means actuated by said control medium comprises a pressure actuated switch in communication with said tube.

8. Device as defined in claim 1, wherein said elongated transmitting means is flexible, and including rigid, stationary tubular guide means for movably guiding said elongated flexible means in said path, said stationary tubular guide means having a horizontal portion and a vertical portion.

9. Device as defined in claim 8, wherein said elongated flexible means comprises a cable and said control medium an electric current passing through said cable, and including a mercury switch at said free end of said cable, said switch being tiltably arranged at said free end and being closed when the level of printing medium in said space reaches said free end of said cable, causing passing of current therethrough, said means actuated by said control means comprising signal means actuated upon passing of current through said cable.

10. Device as defined in claim 8, wherein said elongated flexible means comprises a cable having two conductors extending with bare ends insulated from each other beyond said free end of said cable to form a pair of separate contacts, the printing medium in said space being electrically conductive so as to close said contacts when its level reaches said contacts, said cable being connected at the other end to a source of electrical energy, and signal means in circuit with said conductors to be actuated when current passes therethrough upon closing of said contacts.

11. Device as defined in claim 8, wherein said container comprises a rotatable screen drum of a screen printing machine and including a paint supply tube for feeding paint into said drum, a squeegee engaging the inner surface of said drum so that a pool of paint is formed on one side of said squeegee, said tubular guide means being mounted on said paint supply tube and said free end of said elongated flexible means being located above said pool of paint.

12. Device as defined in claim 8, wherein said elongated flexible means comprises a cable having light guiding plastic filaments extending in longitudinal direction therethrough, and including illuminating means fixed to said cable closely adjacent and opposite said free end thereof so that light emanating from said illuminating means may pass through said filaments, and pump means for feeding printing medium into said container, said means actuated by said light comprising control means for actuating and de-activating said pump and including selenium cells cooperating with said light passing through said light guiding filaments.

13. Device as defined in claim 8, wherein said elongated flexible means comprises a hose of plastic material.

14. Device as defined in claim 8, wherein said substantially vertical portion of said tubular guide means has an end upwardly spaced from the highest level of the printing medium in said container and wherein said elongated flexible means extends with a portion thereof beyond the other end of said tubular guide means.

15. Device as defined in claim 14, and including a guide member fixed to that portion of said elongated flexible transmitting means which extends beyond said other end of said tubular guide means, means for guiding said guide member in longitudinal direction of said portion of said elongated flexible transmitting means, an indicating marker on said guide member, and a stationary scale arranged for cooperation with said marker.

16. Device as defined in claim 8, said admitting means including a pump for feeding printing medium in said space, said means actuated by said control medium passing through said elongated means controlling said pump for de-activating the latter when the level of printing medium fed by the pump into said space reaches the free end of said elongated means.

17. Device as defined in claim 16, wherein said elongated flexible transmitting means is a tube and the control medium passing therethrough a gas, and wherein said means actuated by said gas comprises a switch operated by pressure variations of said gas.

* * * * *